O. ZERK.
GREASE CUP.
APPLICATION FILED JULY 31, 1913.

1,223,019. Patented Apr. 17, 1917.

Witnesses
Roe W Johnston
Justin W Macklin

Inventor
Oscar Zerk,
By Albert H Baker
Atty

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

GREASE-CUP.

1,223,019.  Specification of Letters Patent.  Patented Apr. 17, 1917.

Application filed July 31, 1913. Serial No. 782,178.

*To all whom it may concern:*

Be it known that I, OSCAR ZERK, a subject of the Emperor of Austria, residing at Cleveland, in the county of Cuyahoga and State of Ohio, have invented a certain new and useful Improvement in Grease-Cups, of which the following is a full, clear, and exact description, reference being had to the accompanying drawings.

This invention relates to a grease cup of the type wherein there is a base portion and a cap screwing into it and stationary with it in service. One of the objects of the invention is to provide a base which may be conveniently and cheaply made by stamping. Another object is to provide a very simple spring lock within the base which is effectively held therein by the construction of the base itself. These features will be hereinafter more fully explained in connection with the drawings, which show preferred embodiments of my invention.

Figure 1:
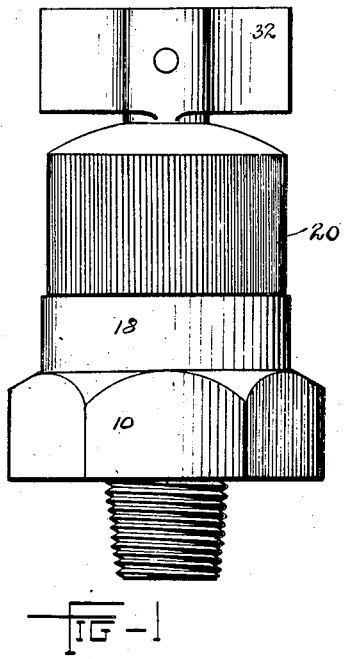
Figure 2:
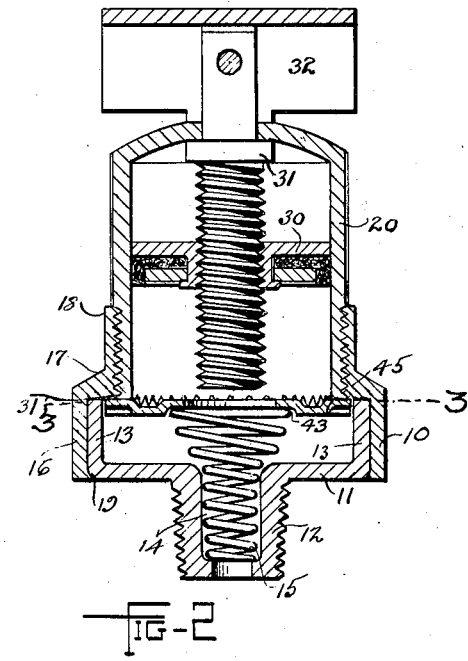
Figure 4:
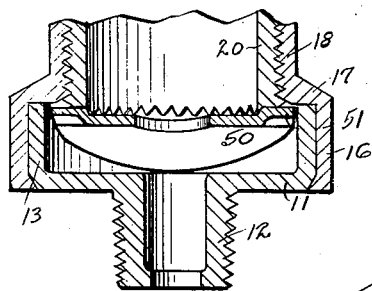
Figure 5:
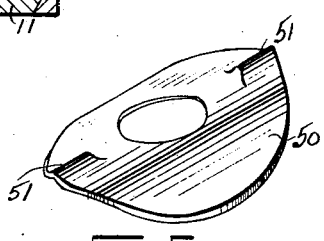
Figure 3:
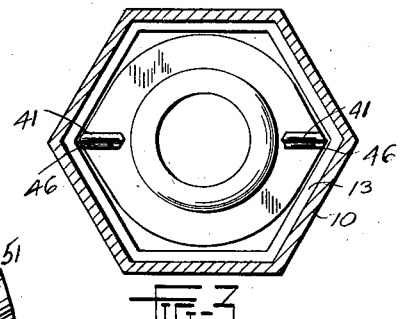

In the drawings, Figure 1 is a side elevation of a grease cup which may be made in accordance with my invention; Fig. 2 is a vertical central section of such grease cup; Fig. 3 is a horizontal section substantially on the line 3—3 of Fig. 2; Fig. 4 is a partial vertical central section of a modified form of spring lock; Fig. 5 is a perspective view of the spring employed in the last mentioned lock.

As shown in Figs. 1 and 2, 10 designates the base of the grease cup, 20 the cap, 30 a plunger within the cap, which is moved by a screw 31 journaled in the cap and having a suitable head 32.

The base 10 of my grease cup is made of two stampings nested one in the other; that is to say, an inner stamping having a bottom 11, an externally threaded nipple 12, and an upwardly extending wall 13, which lies in an angular course, preferably hexagonal. The other stamping of the base has an angular wall 16, which fits snugly over the wall 13, and above this is a convergent portion 17, above which is a cylindrical portion 18 internally threaded to receive the cap. The two parts of the base are held together by upsetting the lower end of the wall 16 into a rounded or a beveled edge 19 on the inner stamping. This makes a very cheaply constructed, and at the same time, efficient base. To lock the cap to the base, I provide a suitable spring lock within the base coöperating with notches on the lower edge of the cap wall. Figs. 2 and 3 show one form of this spring lock consisting of a washer 40, which has upwardly pressed projections 41 adapted to engage the notches. Bearing upwardly against the under side of the washer is a spring 43. This spring is shown as a coiled compression spring seating in the bore 14 of the base and bearing at its lower end against a shoulder 15 provided by a reduction of the size of the bore. At its upper end the spring may be centered by reason of a downwardly pressed annular portion 45 of the washer. The spring and washer described are put in place before the two parts of the base are assembled together. The washer is somewhat elliptical in form; that is to say, it has projecting portions 46 which extend beneath the shoulder provided by the convergent portion 17 of the outer stamping. Accordingly, the washer, while free to move as required, is effectively retained in the base.

Figs. 4 and 5 show a modified form of lock wherein the washer and spring are consolidated into one member. That is to say, in this case there is a spring washer 50 which occupies the base and has projections 51 designed to coact with notches in the lower edge of the cap, the washer being somewhat elevated to engage beneath the convergent portion of the outer base stamping, and also having its edges bent downwardly to bear against the base bottom 11 and give an upward spring action.

Either form of lock is simply and cheaply constructed, is easily put in place, and is not subject to displacement.

It should be noted that the particular form of head 32 for the screw 31 shown herein (consisting of a plate bent over onto opposite sides of the screw shank, each side intermediately given a vertical semi-circular form to receive the shank and thereafter pinned to it) forms the subject matter of my prior application No. 758,553, filed April 3, 1913, and is claimed therein.

Having thus described my invention, what I claim is:

1. In a grease cup, a base including two members, one member comprising a circumferential wall and the other member entirely inclosing said circumferential wall and being contracted over the upper edge of the circumferential wall and a cap extending into and engaging the contracted portion of the latter member, substantially as and for the purpose set forth.

2. In a grease cup, a base including two members, one member comprising a circumferential wall and the other member entirely inclosing said circumferential wall and being contracted over the upper edge of the circumferential wall, and having its other edge contracted around the lower edge of said circumferential wall, substantially as and for the purpose described.

3. In a grease cup, a base consisting of a member having a bottom and an upstanding circumferential wall on the bottom, and a member having a wall encircling and fitting said circumferential wall and a portion extending above the upstanding wall and contracted inwardly over the edge of said wall and engaging said edge, and a cap coacting with the latter portion, substantially as and for the purpose specified.

4. In a grease cup, a base consisting of a member having a bottom and an upstanding circumferential wall on the bottom and a member having a wall encircling and fitting said circumferential wall and a portion extending above the upstanding wall and contracted inwardly over the edge of said wall and engaging said edge, the outer wall also having its lower edge contracted inwardly and lapping the lower face of the bottom, substantially as and for the purpose set forth.

5. As a new article of manufacture, a base for the grease cup consisting of a member having a bottom and an upstanding angular wall, and an upper member having a round threaded portion and a downward angular wall extending over the wall of the first mentioned member.

6. As a new article of manufacture, a grease cup base comprising an inner member having a nipple and an upstanding angular wall, and an outer member round and internally threaded at its upper portion and having its lower portion angular and nesting with the lower member.

7. In a grease cup, a base having a lower member comprising a nipple, a bottom and an upstanding angular wall, and an upper member having an upper rounded portion, from the lower edge of which is a divergent annular portion, from the lower edge of which is a downwardly extending angular portion lying on the outside of the angular portion of the lower member.

8. In a grease cup, a base including two members with walls nested one within the other, the wall of the outer member being contracted over the upper edge of the wall of the inner member, the outer member having a wall rising from its contracted portion, a cap coacting with the last-named wall, and a locking member located in the base and having portions extending under said contracted portion, substantially as and for the purpose described.

9. In a grease cup, the combination, with the cap and base, of a spring lock within the base comprising a washer adapted to move bodily in the base and coact with notches in the cap, the washer being retained in the base by reason of a convergent portion of the base itself.

10. In a grease cup, the combination of a base made of two parts, one nesting within the other, a cap screwing into the upper portion of the outer member, said outer member having a laterally extending portion between the part which engages the lower member and the part which engages the cap, and a spring lock within the base coacting with the notches of the cap and retained by the lateral portion of the base.

11. In a grease cup, the combination of a base having a nipple, a portion with an angular exterior adapted to receive a wrench and with an angular cavity and an internally threaded round wall, a cap screwing into said wall and notched at its lower edge, and a spring lock within the base and including a washer having projections adapted to coact with the notches of the cap and having lateral extensions beneath the threaded wall of the base and retained within the base.

12. In a grease cup, a base including a bottom, an upstanding polygonal wall rising from the bottom and an inwardly contracted portion at the upper edge of the polygonal wall, a cap threading into the base, and a locking washer located in the base and having portions extending into angles of said polygonal wall, and under said contracted portion, the washer coacting with the cap, substantially as and for the purpose specified.

13. In a grease cup, the combination of a base comprising an inner member having a nipple, a bottom and an upstanding hexagonal wall, an outer member having an upper internally threaded round portion, a divergent annular portion, a hexagonal downwardly extending wall snugly surrounding the upwardly extending wall of the first mentioned portion, a cap screwing into such screw threaded wall, and a spring lock mounted within the base and coacting with the lower edge of the cap, said lock having a washer with projections extending into the angles of the base beneath the annular portion of the upper base member.

In testimony whereof, I hereunto affix my signature in the presence of two witnesses.

OSCAR ZERK.

Witnesses:
BRENNAN B. WEST,
ALBERT H. BATES.